US006193113B1

(12) United States Patent
Hidding

(10) Patent No.: US 6,193,113 B1
(45) Date of Patent: Feb. 27, 2001

(54) DISPENSING SYSTEM WITH FLUTED PROBE AND VALVED CLOSURE

(76) Inventor: Douglas J. Hidding, 412 Caesar Dr., Barrington Hill, IL (US) 60010

( * ) Notice: Subject to any disclaimer, the term of this patent is extended or adjusted under 35 U.S.C. 154(b) by 0 days.

(21) Appl. No.: 09/295,724

(22) Filed: Apr. 21, 1999

(51) Int. Cl.[7] ............................ B65D 88/54; G01F 11/06; G01F 11/30; G01F 11/36; G01F 11/42

(52) U.S. Cl. ..................... 222/325; 222/83.5; 222/146.6; 141/18; 141/351; 141/363; 141/364

(58) Field of Search ................................ 141/18, 21, 285, 141/286, 288–301, 308, 346–364, 329–332, 319–322, 363–366, 353–356, 383, 385, 386; 222/325, 83.5, 146.6, 146.1

(56) References Cited

U.S. PATENT DOCUMENTS 5,224,527 * 7/1993 McCunn et al. ..................... 141/346
5,617,906 * 4/1997 Braatz et al. ........................... 141/21
5,647,416 * 7/1997 Desrosiers et al. .................. 141/351

* cited by examiner

*Primary Examiner*—Timothy L. Maust
(74) *Attorney, Agent, or Firm*—Baker & McKenzie

(57) ABSTRACT

A dispensing device for use in extracting liquid, such as water, from a container of the type which is inverted into a position above a reservoir. The device includes probe which is of simple construction and wherein the surfaces of the probe are exposed and readily observed or inspected. In a preferred embodiment, the probe has a cruciform cross-section through which water may flow when the probe is inserted into an inverted water bottle to separate an inner cap from a sleeve in the center of the closure of the bottle. The probe is supported by and projects from a base which has apertures through which water may flow into a reservoir of the dispenser with which the probe is used. If the probe is a replacement part for an existing dispenser, as opposed to being designed and sold as part of a new dispenser, the base which supports the probe may have an externally threaded cylindrical or cup-shaped portion extending in a direction opposite to that of the probe. The threaded portion of the probe enables a older style tubular probe of an existing dispenser to be replaced by a probe of the present invention. The tip of the probe has a groove for engaging an internally directed bead or rib on the inside surface of the inner cap element (or the plug), whereby the inner cap and the sleeve may be brought into a sealing relationship when the bottle is removed from the dispenser. To assist in maintaining the shape of sleeve of the closure as it is brought into sealing relationship with the inner cap, the probe has a series of discs just below the groove. The discs hold the sleeve in a cylindrical shape as the sleeve is lifted into engagement with the inner cap.

17 Claims, 6 Drawing Sheets

DISPENSING SYSTEM WITH FLUTED PROBE AND VALVED CLOSURE

BACKGROUND AND SUMMARY OF THE INVENTION

The present invention relates to dispensers of the type which are used in conjunction with inverted bottles of water. In particular, the invention relates to dispensers which are intended to operate a valved closure which seals the opening of a bottle, commonly containing water.

For many years, it has been and continues to be common to see around offices and factories an inverted 5-gallon container sitting atop a cooler to provide drinking water to office and factory workers. In the past, such containers of water were placed on the coolers after removing the closure on the container. This process often resulted in at least some spillage of water when replacement of the supply container became necessary.

In the early 1990's, substantial numbers of bottlers began to offer dispensing systems which included a valved closure and a feed tube built into the cooler for operating the valved closure. These features, and others, addressed and solved the spillage problem referenced above. Examples of such systems are shown in U.S. Pat. No. 5,121,778 and No. 5,647,416. Such systems include elaborate componentry and structures designed, among other things, to filter the air which replaces dispensed fluid. A further example of a system which filters air entering the container as fluid is dispensed is shown in U.S. Pat. No. 4,699,188. Bottlers, and more particularly, consumers, have come to recognize the advantages of systems which eliminate the difficulty associated with inverting a bottle of water with an open and large diameter spout. However, the advantages of air-filtering are open to question. Indeed, the elaborate and expensive componentry needed to control air entering the container has given rise to the need for a simpler non-spill dispensing arrangement. The closed fluid paths associated with complicated systems used in air-filtered dispensing create an environment which may be conducive, under certain circumstances, to the growth of bacteria and other detrimental pathenogenic agents.

Consumers have become more interested in the use of bottled water in their homes, as well as in offices and factories. Crock-type dispensers, which are not refrigerated, have become commonplace in kitchens throughout the country, particularly in regions where tap water is either expensive or of questionable quality. Even where tap water is inexpensive and of high quality, many consumers feel that bottled water is a significant improvement over water obtained from a municipal source. It is therefore desirable to provide a dispensing system for use in homes which takes advantage of the non-spill convenience of a valved container of bottled water.

In accordance with the present invention, a probe is provided wherein all of the surfaces of the probe are in plain sight and can be easily seen and cleaned. The probe of the present invention has flutes, rather than enclosed feed tubes. The probe has a cruciform cross-section which defines the flutes and which create fluid pathways for the entry of air into a container and the exit of water from a container through a passageway in a valved cap. The probe is supported by a base which contains apertures through which the water may fall into the reservoir of a cooler or crock-type dispenser. The probe includes a grooved tip for retaining that portion of the valved cap which reseals the central tube upon removal of the bottle from the dispenser. In a preferred embodiment of the invention, the probe includes lateral disc-shaped supports at the upper end of the probe to support the walls of the central tube as the resealing element of the closure is positioned on the central tube when the container is removed from the dispenser.

The objects and advantages of the invention will be better understood upon a reading of the following detailed description of the invention when read in conjunction with the accompanying drawings, wherein:

DETAILED DESCRIPTION OF THE INVENTION

Figure 1:
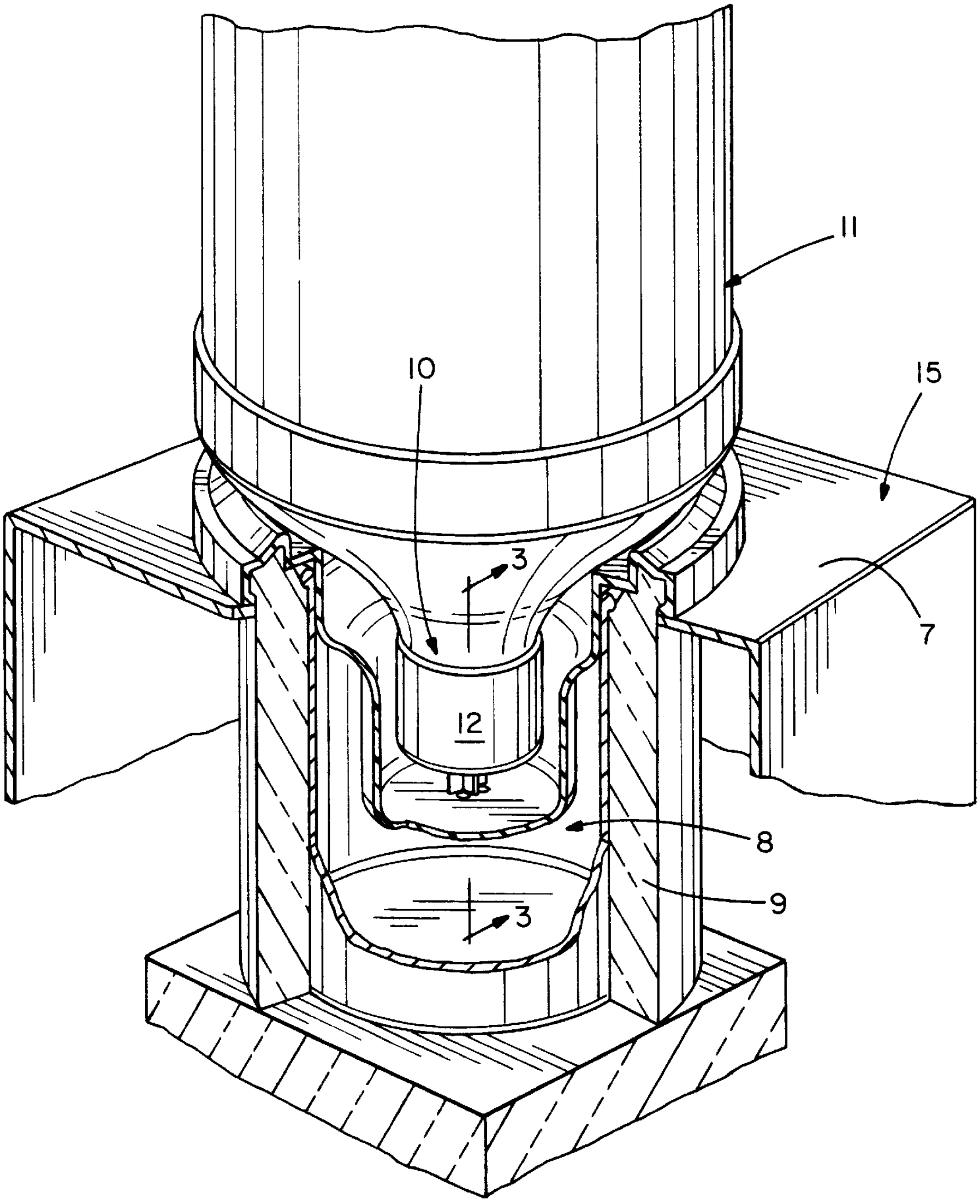
FIG. 1 is a perspective view, partially cut away, of a dispenser made in accordance with the present invention.

FIG. 1 shows a container 11 inverted into a dispensing position on top of a cooler 15. The cooler 15 has a reservoir 8 which is surrounded by an insulating jacket 9. The reservoir 8 and the jacket 9 are surrounded by an enclosure 7.

Figure 2:
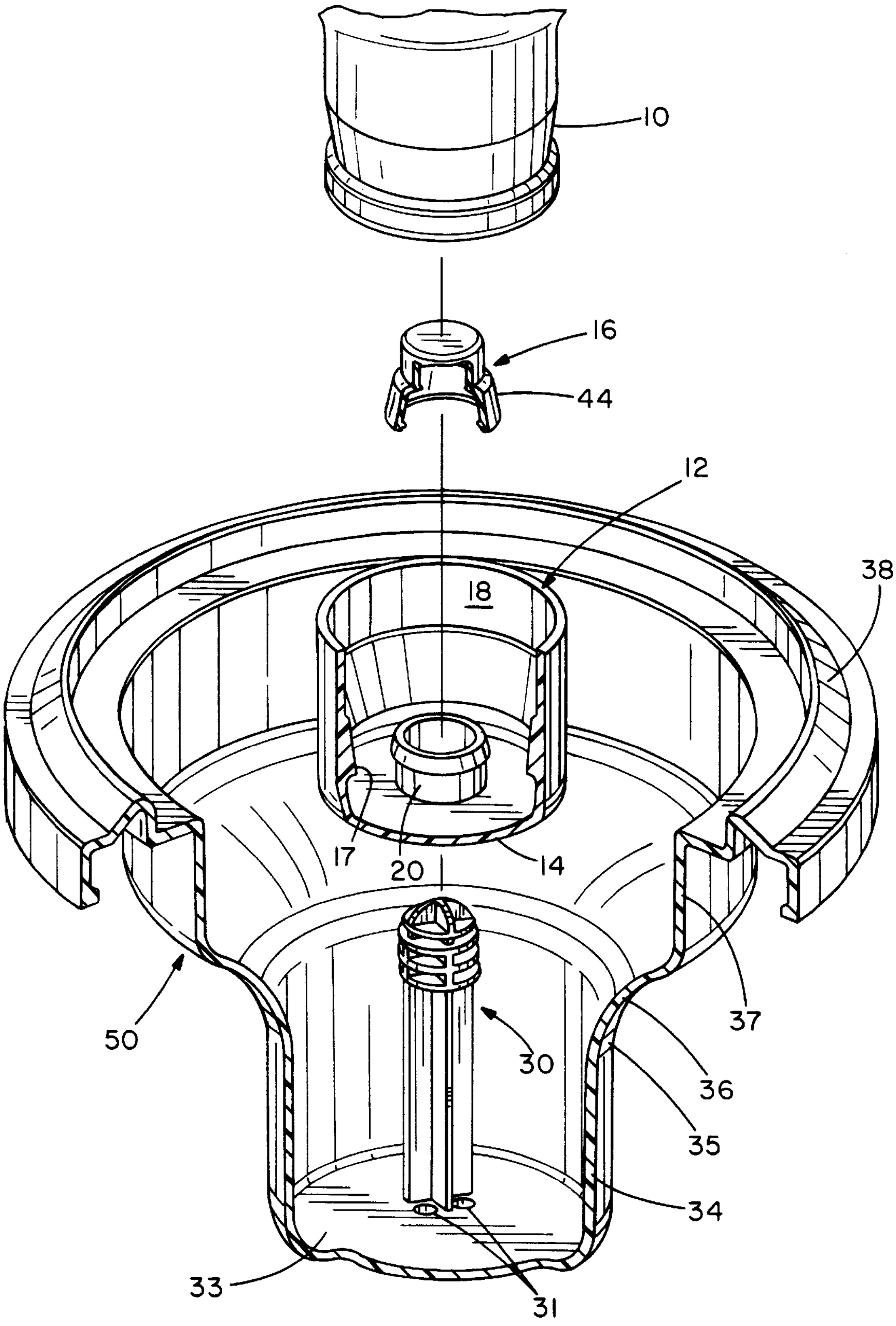
FIG. 2 is an exploded perspective view of the dispense and an associated cap as shown in FIG. 1.

FIG. 2 is an exploded view of some of the components shown in FIG. 1. A cap 12 which includes an inner cap 16 is installed on a bottleneck 10. The cap 12 includes a skirt 18 and a retaining bead 17 which fits into a complementary groove on the bottleneck 10 to hold the cap 12 in place on the container 11 during the inversion of the container prior to its placement onto a cooler. The receiver 50 includes a flange 38 which engages the top of the cabinet 7 and the insulating jacket 9 (see FIG. 1). The receiver 50 has a first large diameter vertical section 37 which leads at its lower end to a sloped section 36. The sloped section 36, in turn, leads to a smaller diameter vertical section 34. The lowermost section of the receiver 50 is a support 33 from which the probe 30 projects. The support 33 includes a plurality of apertures 31.

Figure 3:
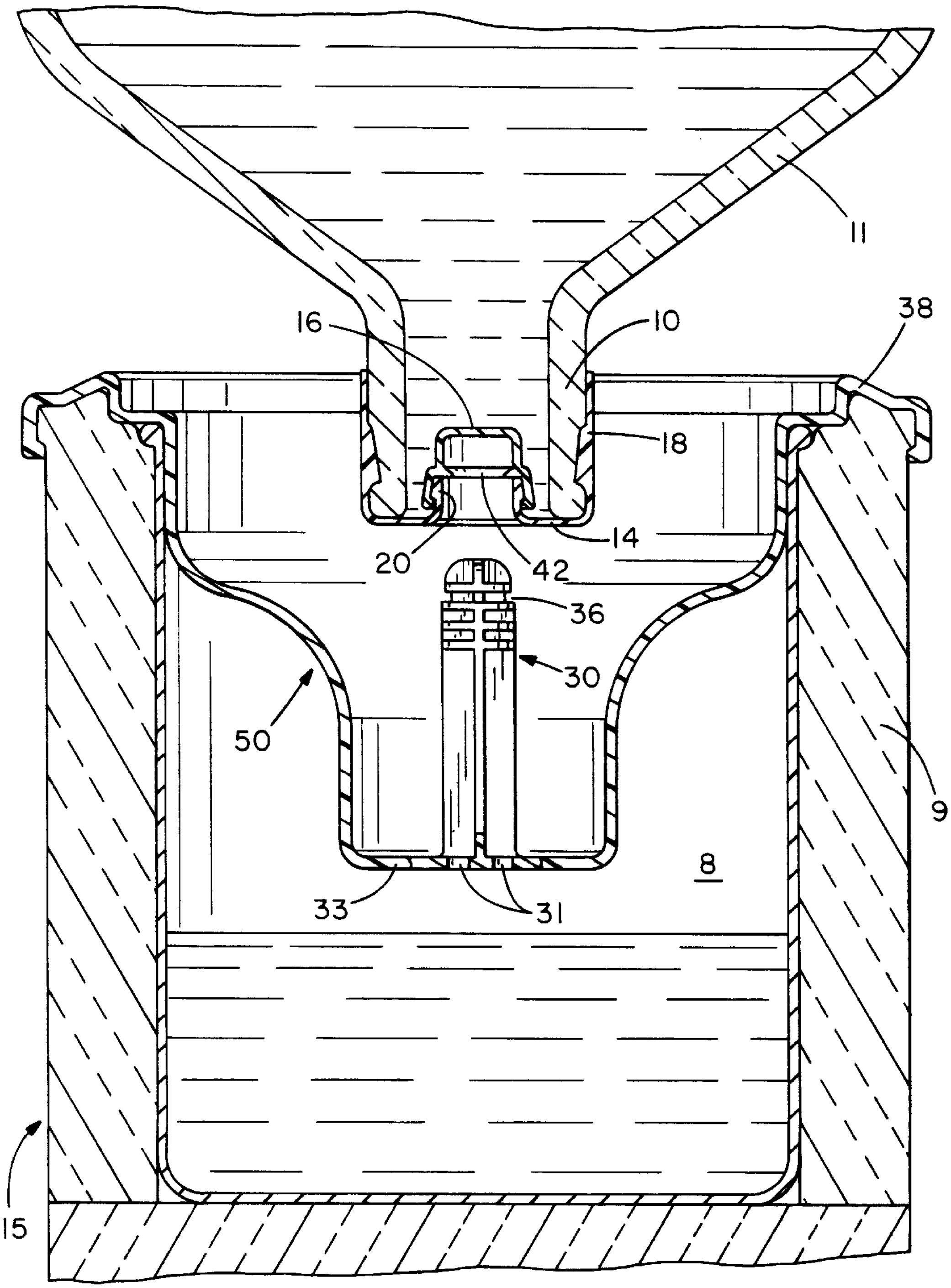
FIG. 3 is a sectional view of a dispenser and cap in accordance with the present invention showing the probe and cap just prior to the engagement of the cap with a probe.
Figure 4:
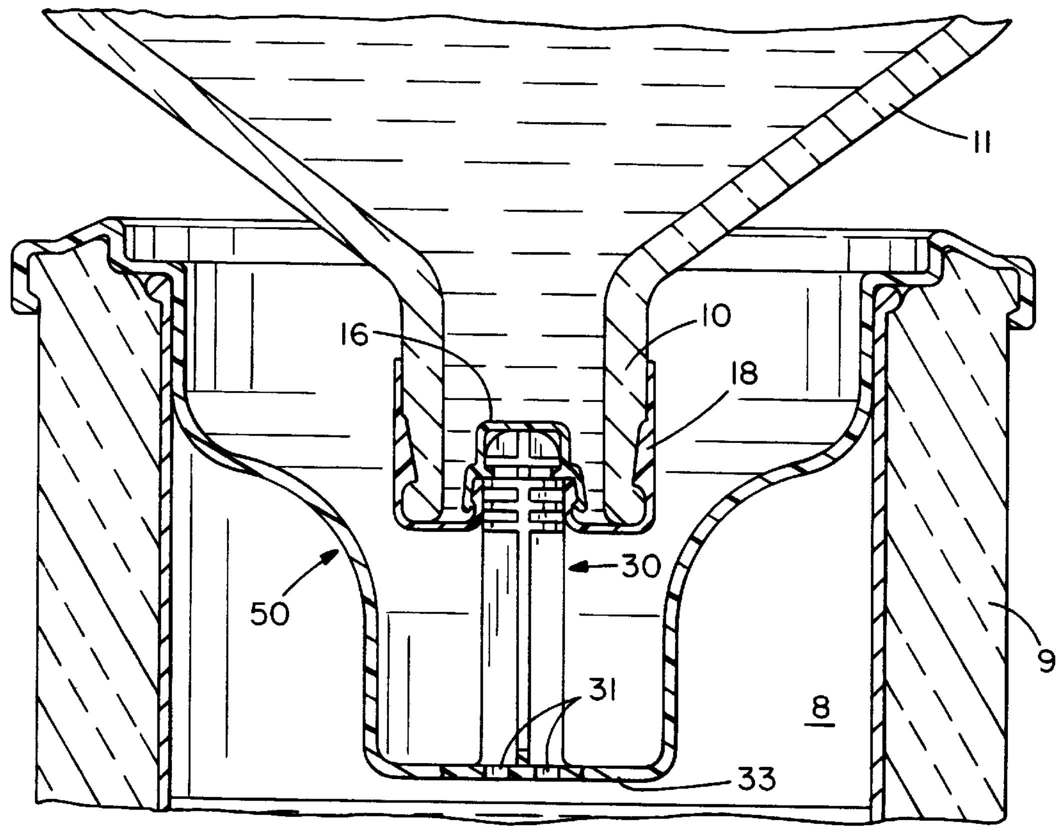
FIG. 4 is a sectional view of a dispenser and cap in accordance with the present invention at the moment when the probe and cap are first engaged.

As the container 11 carrying a cap 12 is lowered into the receiver 50 (See FIGS. 3 through 5), the probe 30 is inserted into a central tube 20 formed in the base 14 of the cap 12. The weight of the container (which is filled with water) causes the central tube 20 to slide downwardly around the probe 30. As such sliding occurs, the probe 30 engages the inner cap 16. A probe gripping bead 42 fits snappingly into a groove 36 on the upper portion of the probe 30. The weight of the container filled with water then causes the central tube

20, which is carried by the base 14 of the cap 12, to move further down along the probe 30. At the same time, the inner cap 16 is prevented from further downward displacement by the tip of the probe 30. As the skirt 18, base 14, and central tube 20 of the cap 12 continue to move downwardly along the probe 30, flutes 25 which are defined by fins 24 are brought into fluid communication with the inside of the container 11. This allows water to flow out of the container and allows replacement air to enter the container.

Figure 5:
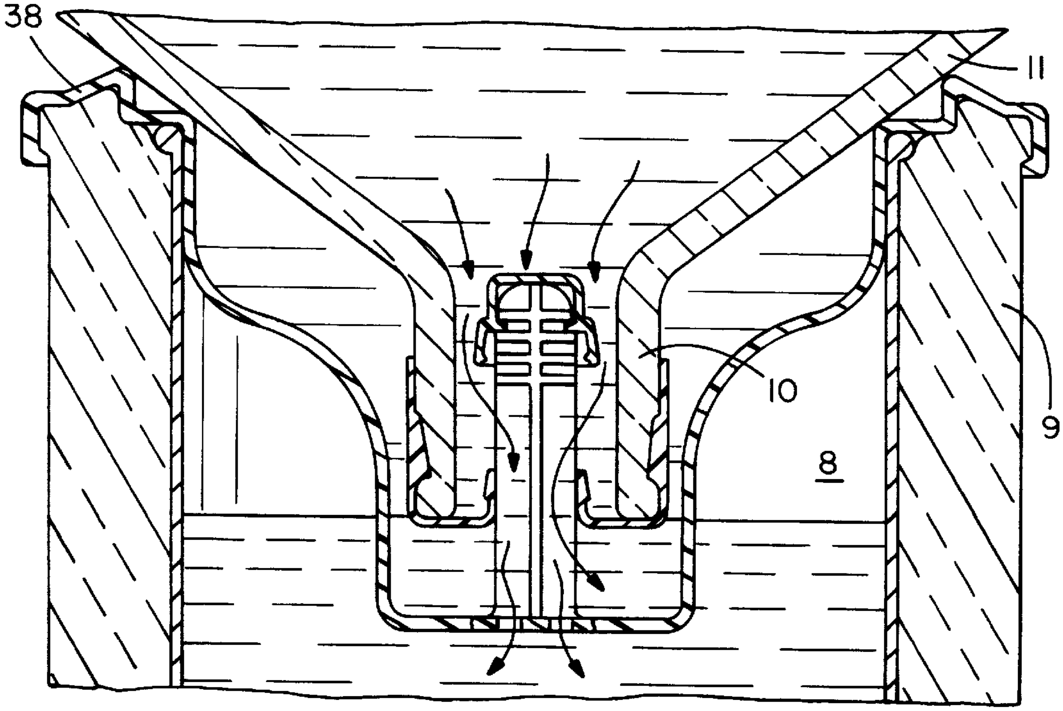
FIG. 5 is a sectional view of a cap and dispenser of the present invention with the cap and probe fully engaged and the bottle shown in a use position.
Figure 6:
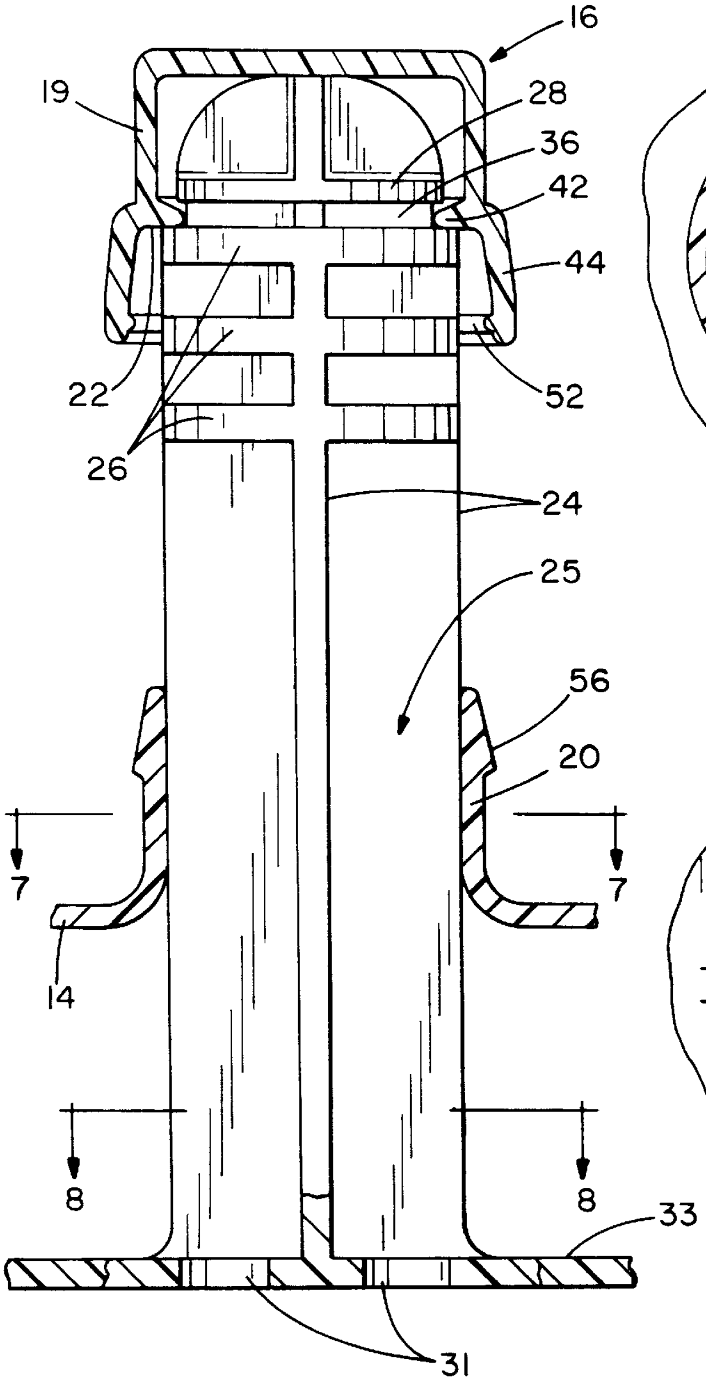
FIG. 6 is an enlarged sectional view of the probe and inner cap of the present invention.

FIGS. 5 and 6 show the position of the two components of the cap 12 (i.e., the base/skirt portion and the inner cap) when the shoulder of the bottle 11 engages the flange 38 and no further downward movement of the bottle is possible. In FIG. 5, the solid arrows show the direction of flow of water out of the container, and the dot-lined arrows show the direction of the flow of air into the container. When the water in the reservoir reaches the level of the base 14 of the cap 12 (which water level is shown by reference number 27), air is prevented from entering the container and, therefore, further water is prevented from exiting the container. As water is withdrawn from the reservoir and the water level in the reservoir drops below the level of the base 14 of the cap 12, the reservoir is restocked with water which flows out of the container and through the apertures 31.

FIG. 6 shows the position of the inner cap 16, as retained by the grooved tip of the probe 30. The inner cap 16 includes an upper portion 19 joined to a sealing sleeve 44. The probe gripping bead 42 is directed radially inwardly from the upper part of the sealing sleeve 44. A shoulder 22 engages the uppermost portion of the central tube 20 when the bottle is removed from the dispenser, which causes the inner cap 16 to be repositioned in engagement with the central tube 20. The central tube 20 includes a sloped surface 56 and a bead 54. The bead 54 and a complementary bead 52 on the sealing sleeve 44 create the primary seal between the inner cap 16 and the remainder of the cap 12.

FIG. 6 also shows, in considerable detail, the configuration of the probe 30 of the present invention. The fins 24 define the flutes 25 which act as fluid pathways for water leaving the container and air entering the container. Three disk-like flanges 26 are disposed at the upper end of the probe 30 below the groove 36. These disk-like flanges 26 support and hold the central tube in a shape which facilitates the reconnection of the inner cap 16 to the central tube 20 and a bottle is removed from the dispenser. It should be noted that the outer edges (both upper and lower) of the disk-like flanges 26 should be well radiused to prevent scarification of the inside surface of the central tube 20, and to prevent unwanted interference of the upper edge of the central tube with the disk-like flanges 26 as the central tube 20 is lifted into engagement with the inner cap 16 upon removal of the container from the dispenser. Similarly, the upper and lower outer edges of the flange 28 should be rounded (i.e., radiused) to prevent damage (by scraping) to the probe gripping bead 42. Preferably, all of the edges of the probe which contact the cap are made with significant radii to avoid damaging the cap, the cap being susceptible to damage because of the soft nature of the material used to form the cap, i.e. a low density polyethylene, such as Eastman TENITE™ Polyethylene #808A. Use of soft materials such as low density polyethylene makes it easier for the surfaces of the cap to form a seal, both at the skirt's interface with the bottle, and the sleeve's interface with the inner cap.

Figure 7:
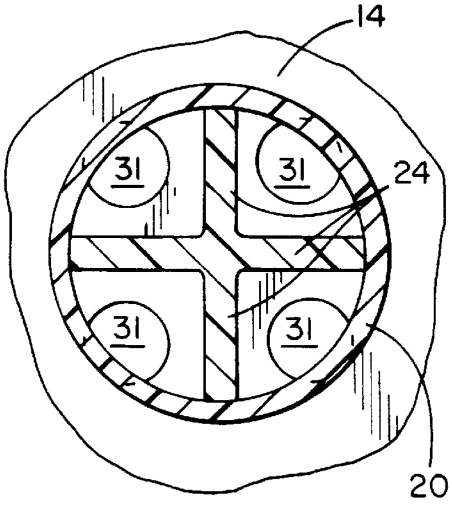
FIG. 7 is an enlarged cross-sectional view taken along line 7—7 of FIG. 6.
Figure 8:
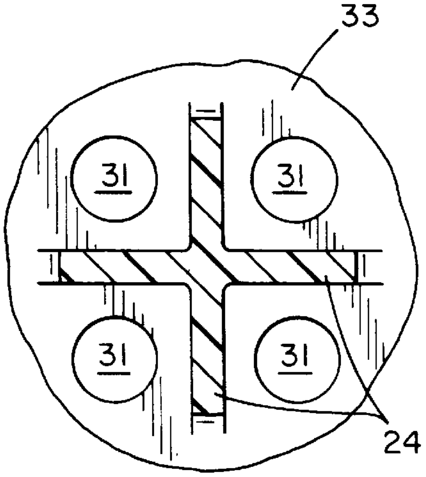
FIG. 8 is an enlarged sectional view taken along line 8—8 of FIG. 6.

FIGS. 7 and 8 show the alignment of the apertures 31 with the flutes 25. In FIG. 7, the fins 24, which define the flutes 25, are in engagement with the inside surface of the central tube 20. FIG. 8 shows the relative position of the apertures 31 and the fins 24, there being one aperture 31 for each fin 24 and for each flute 25.

Figure 9:
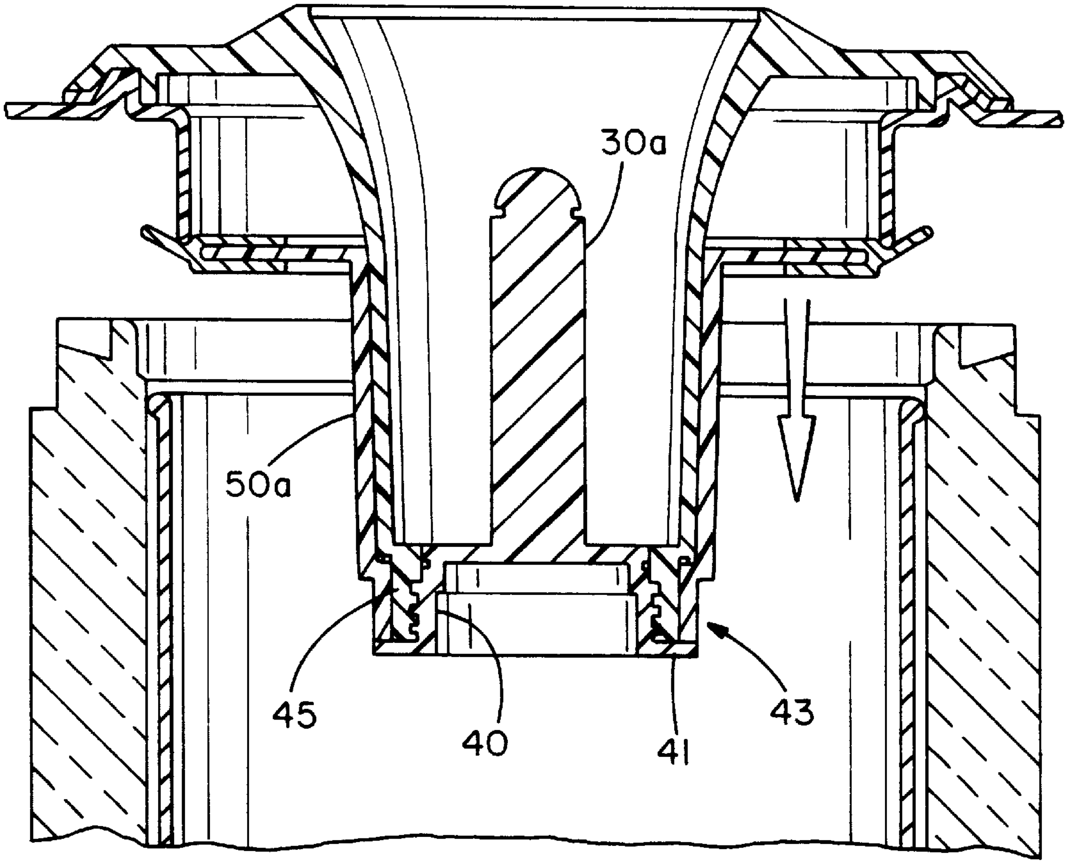
FIG. 9 is a sectional view of an alternative embodiment of a dispenser in accordance with the present invention.

FIG. 9 shows an alternative embodiment of the probe of the present invention. Probe **30*a* is supported by a base 33*a* which is cup-shaped, and which includes a probe fitting 40 which is externally threaded and a flange 41. The receiver 50*a* is equipped with a lower end 43 which has an internally threaded fitting 45 so that the probe 30*a* may be removably attached to the lower end of the receiver 50*a*. The flange 41 is preferably faceted (e.g., hexagonally shaped) so that the probe 30*a* can be snugly brought into threaded engagement with the lower end of receiver 50*a*. The remaining portion of the receiver 50*a*** is of the type shown in U.S. Pat. No. 5,526,961, and is one example of many such arrangements which are known to persons skilled in the art of dispenser design.

The foregoing description provides specification of various forms of the instant invention by reference to certain preferred embodiments. However, a variety of modifications and improvements to the discussed embodiments of the present invention will be apparent to those skilled in the art. Accordingly, no limitation is intended by way of the foregoing descriptions and accompanying drawings. Indeed, it will be apparent to those skilled in the art that numerous alternatives, modifications and variations of the embodiments shown herein may be made without departing from the spirit and scope of the claims.

What is claimed is:

1. A probe for a dispenser comprising a base with at least one fluid passageway extending therethrough, a projecting member extending generally perpendicularly from said base, at least one open channel extending along at least a portion of the exterior surface of said projection, said open channel defining a fluid flow path in fluid communication with said fluid passageway in said base, said projecting member having a free end opposite said base, said free end having a circumferential groove for snappingly receiving a bead therein.

2. A probe in accordance with claim 1 wherein:

said base is cup-shaped and an external longitudinal surface of said cup-shaped base is threaded.

3. A probe in accordance with claim 2 wherein:

a flange is formed on said cup-shaped base at one end, said flange having an hexagonal perimeter.

4. A probe in accordance with claim 3 wherein:

said probe has a plurality of open channels defined by a plurality of longitudinal ribs, said ribs extending from said base to an upper section being adjacent to and below said groove.

5. A probe in accordance with claim 4 wherein:

said upper section includes lateral supports between said ribs, said lateral supports extending outwardly from a central axis of said probe a distance substantially equal to the distance which each of said ribs extends from said axis.

6. A probe in accordance with claim 4 wherein:

said probe has a number of equally spaced ribs defining said number of equally sized open channels, said base having said number of fluid passageways, each generally aligned with one of said open channels.

7. A probe in accordance with claim 6 wherein:

said number is four.

8. A probe in accordance with claim 5 wherein:

said supports are comprised of disc-like members, each having a rounded outer edge.

9. A probe in accordance with claim 5 wherein:

said rounded outer edges of said disc-like members define a circular cylindrical shape, and said plurality of disc-like members are spaced axially along said upper section of said probe.

10. A probe for use in dispensing a liquid from an inverted container through a closure carried by said container, said closure having a central sleeve through which said probe extends from the outside of said container to the inside of said container, said probe comprising:

a base with means for allowing said probe to be removably connected to a container support structure, a fluid passageway extending through said base, an elongated rigid member extending perpendicularly from said base and having a free upper end, said member having at least one open channel extending from said base to an upper section of said member, said upper section having a means for engaging and retaining a sealing portion of said closure, said flute on said member being in fluid communication with said fluid passageway whereby air enters said container through said flute, and liquid within may pass from said container through said flute and through said passageway into said reservoir.

11. A probe in accordance with claim 10 wherein:

said means for engaging and retaining a sealing portion of said closure comprises a groove in said upper section.

12. A probe in accordance with claim 11 wherein:

said elongated member has a plurality of open channels defined by a plurality of ribs, and said upper section has a plurality of disc-like members with rounded outer edges disposed between said ribs, said outer edges defining a circular cylinder with a diameter matching said central sleeve.

13. A dispensing system for use in dispensing liquid from an inverted container via a dispenser comprising:

a valved cap and a probe, said cap having an outer skirt for fitting tightly onto a container neck, a central sleeve, and a closure for selectively allowing flow of liquid through said central sleeve, said probe having a base and an elongated member extending from said base, said member having a length longer than said central sleeve, said member having at least one open channel forming an external fluid path extending along the length of said member, said base having a fluid passageway for allowing liquid to pass from said fluid path and through said base, said member having a grooved tip and said closure having a formation shaped to releasably engage said grooved tip to form a first connection between said closure and said probe, said closure and said central sleeve being releasably connected by a second connection, said first connection having a pre-determined first release force required to disconnect said first connection whereby said probe is disconnected from said closure upon removal of said cap and said container, said second connection having a predetermined second connecting force required to close said second connection between said central sleeve and said closure, said release force being greater than said connecting force whereby said sleeve and closure are connected before said probe is released from said closure upon removal of said container from said dispenser.

14. A dispensing system in accordance with claim 13 wherein:

said probe has a plurality of open channels forming a plurality of external fluid paths extending along said length of said member, said paths being formed by ribs, and a plurality of support members disposed between said ribs, each support member having an outwardly facing partially cylindrical surface shaped to abut a portion of said central sleeve as said second support members support said central sleeve and hold said sleeve in alignment with said closure in preparation for closing said second connection.

15. A dispensing system in accordance with claim 14 wherein:

said second connection between said central sleeve and said closure has a predetermined second release force required to open said second connection, and said first connection between said probe and said closure has a predetermined first connecting force required to connect said probe to said closure, said first connecting force being less than said second release force, whereby the connection between said probe and said closure is ensured prior to release of said closure from said central sleeve as said container is lowered onto said probe.

16. A dispensing system in accordance with claim 13 wherein:

said probe has support means for maintaining the shape of said central sleeve as said closure is connected to and disconnected from said central sleeve.

17. A dispensing system in accordance with claim 16 wherein:

said support means includes a cylindrically shaped surface at an upper section of said probe below said grooved tip, said cylindrically shaped surface having an axial extent approximately equal to the length of said central sleeve of said cap.

* * * * *